United States Patent

Fujii et al.

Patent Number: 5,341,362
Date of Patent: Aug. 23, 1994

[54] OPTICAL MEMORY DEVICE HAVING GUIDE TRACKS SHAPED FOR INCREASING THE QUALITY OF INFORMATION SIGNALS

[75] Inventors: Yoshikazu Fujii; Tetsuya Inui; Toshihisa Deguchi, all of Nara; Kenji Ohta, Osaka, all of Japan

[73] Assignee: Sharp Kabushiki Kaisha, Osaka, Japan

[21] Appl. No.: 978,039

[22] Filed: Nov. 18, 1992

Related U.S. Application Data

[63] Continuation of Ser. No. 663,048, Feb. 26, 1991, abandoned, which is a continuation of Ser. No. 555,677, Jul. 20, 1990, abandoned, which is a continuation of Ser. No. 767,537, Aug. 20, 1985, abandoned.

[30] Foreign Application Priority Data

Aug. 20, 1984 [JP] Japan ................. 59-174736

[51] Int. Cl.$^5$ ............. G11B 7/24; G11B 13/04
[52] U.S. Cl. ............. 369/275.4; 369/275.2; 369/13
[58] Field of Search ............. 369/275.1–275.5, 369/284, 13, 286, 277, 279, 109

[56] References Cited

U.S. PATENT DOCUMENTS

| | | | |
|---|---|---|---|
| 4,245,229 | 1/1981 | Stephens | 369/275 |
| 4,385,303 | 5/1983 | Akahira et al. | 369/280 |
| 4,390,600 | 6/1983 | Ohta et al. | |
| 4,414,650 | 11/1983 | Ohta et al. | |
| 4,417,331 | 11/1983 | Takaoka et al. | 369/111 |
| 4,423,502 | 12/1983 | Dil | |
| 4,426,693 | 1/1984 | Satoh et al. | 369/116 |
| 4,455,632 | 6/1984 | Braat | |
| 4,467,383 | 8/1984 | Ohta et al. | |
| 4,481,620 | 11/1984 | Murakami | 369/109 |
| 4,489,139 | 12/1984 | Ohta et al. | |
| 4,525,826 | 6/1985 | Nakamura et al. | 369/109 |
| 4,544,443 | 10/1985 | Ohta et al. | |
| 4,586,173 | 4/1986 | Ando | 369/109 |
| 4,587,648 | 5/1986 | Ando | 369/275.1 |
| 4,610,912 | 9/1986 | Takahashi et al. | |
| 4,634,617 | 1/1987 | Ohta et al. | |

FOREIGN PATENT DOCUMENTS

| | | | |
|---|---|---|---|
| 367229 | 6/1982 | Austria | |
| 100995 | 2/1984 | | |
| 0108258 | 5/1984 | European Pat. Off. | |
| 0132137 | 1/1985 | European Pat. Off. | |
| 3131212 | 3/1982 | Fed. Rep. of Germany | |
| 3342748 | 5/1984 | Fed. Rep. of Germany | |
| 0023333 | 2/1983 | Japan | 369/275 |
| 0100248 | 6/1983 | Japan | 369/275 |
| 0102347 | 6/1983 | Japan | 369/275 |
| 59-177744 | 10/1984 | Japan | |

OTHER PUBLICATIONS

Isailovic, J., *Videodisc and Optical Memory Systems*, Prentice-Hall, 1985, pp. 36, 38.
Proceedings of SPIE–The International Society for Optical Engineering, vol. 1 pp.85–90; "Optical Disks Systems and Applications".

*Primary Examiner*—Hoa T. Nguyen

[57] ABSTRACT

An optical memory device comprising a substrate and guide tracks having a depth of $\lambda/8n$ or less formed on said substrate, wherein $\lambda$ is the wavelength of laser light used for the optical memory device, and n is the refraction index of the guide track portion of the substrate.

2 Claims, 6 Drawing Sheets

OPTICAL MEMORY DEVICE HAVING GUIDE TRACKS SHAPED FOR INCREASING THE QUALITY OF INFORMATION SIGNALS

This application is a continuation of application Ser. No. 07/663,048 filed on Feb. 26, 1991, now abandoned, which is a continuation application of Ser. No.: 07/555,677, filed on Jul. 20, 1990, now abandoned, which is a continuation application of Ser. No.: 06/767,537, filed on Aug. 20, 1985, now abandoned.

BACKGROUND OF THE INVENTION

1. Field of the Invention:

This invention relates to an optical memory device which conducts at least one of a recording operation, a regenerating operation, or an erasing operation of information by means of light. More particularly, it relates to the shape of guide tracks and/or track addresses of the optical memory device.

2. Description of the Prior Art:

Optical memory devices have come to public notice as a dense and mass memory device. They can be classified into three groups consisting of regenerative memory devices, additional recording permit memory devices and rewrite permit memory devices. Optical memory devices, which can be classified into additional recording permit memory devices and rewrite permit memory devices, generally have guide tracks to guide a light beam for recording and/or regenerating information to a given portion of the optical memory device. A portion of each of the guide tracks can be formed into a pit-shape, resulting in a track address. For example, the optical memory disk shown in FIG. 1 comprises a substrate 1 and a plurality of guide tracks and track addresses 2 and 3, both of which are concentrically or spirally formed on the substrate 1. (A single guide track 2 and a single track address 3 are only illustrated herein for easy understanding.)

FIGS. 2 and 3 show the guide tracks 2 and the track addresses 3. The depth d of the guide tracks 2 is selected to be $\lambda/8n$ to maximize the quantity of tracking servo signal, while the depth d' of the track addresses 3 is selected to be $\lambda/4n$ to maximize the quantity of track address signal, wherein $\lambda$ is the wavelength of laser light, etc., used for the optical memory device and n is the refraction index of the portions of the guide tracks 2 and/or the track addresses 3 of the substrate 1.

FIG. 4 shows a recording medium layer m on the substrate 1. A laser beam 4 is radiated in a spot fashion to the recording medium layer m, resulting in a variation in the reflectivity of the recording medium layer m. The variation is retained thereon as a record of information based on the laser beam 4. When the laser beam 4 is later radiated in a spot fashion to the recording medium layer m in the same manner as above-mentioned, the variation can be read out and regenerated as a signal.

The conventional shape of the guide tracks 2, which is determined in such a manner to maximize the quantity of the tracking servo signal, is not necessarily advantageous for recording and/or regeneration of information. For instance, a regeneration signal from the recording medium layer m on a flat substrate having no guide tracks 2 has a more excellent quality than that from the recording medium layer m on a rugged substrate having guide tracks 2, because, although the guide tracks allow for an increase in the quantity of signal, the edges of the guide tracks cause noise in the signal. Since the guide tracks are essential to optical memory devices which are of additional recording permit memory and/or rewrite permit memory types, noise due to the shape of the guide tracks must be minimized and the quantity of signal therefrom must be maximized.

On the other hand, the shape of the track addresses 3 (shown in FIG. 2) is determined in light of both the ease or difficulty of the formation thereof and the quantity or quality of address signal, and thus the depth d' thereof is not necessarily required to be $\lambda/4n$.

SUMMARY OF THE INVENTION

The optical memory device of this invention which overcomes the above-discussed and numerous other disadvantages and deficiencies of the prior art, comprises a substrate and guide tracks having a depth of $\lambda/8n$ or less formed on said substrate, wherein $\lambda$ is the wavelength of laser light used for the optical memory device, and n is the refraction index of the guide track portion of the substrate.

The substrate is, in a preferred embodiment, a substrate used for the recording of information based on a variation in the reflectivity of recording media thereon, the formation of pits thereon, the photomagnetic effect, etc., the depth of said guide tracks of the substrate being in the range of $\lambda/48n$ to $\lambda/12n$.

The guide tracks of the substrate contain, in a preferred embodiment, pit-shaped track addresses, the depth d of the guide tracks being equal to the depth d' of the pit-shaped track addresses and ranging from $\lambda/24n$ to $\lambda/12n$, wherein n is the refraction index of the guide track portion and the track address portion on the substrate.

The substrate is, in a preferred embodiment, used for the recording of information based on a variation in the reflectivity of recording media thereon, the formation of pits thereon, the photomagnetic effect, etc.

The guide tracks of the substrate contain, in a preferred embodiment, pit-shaped track addresses, the depth d of the guide tracks being in the range of $\lambda/24n$ to $\lambda/12n$ and the depth d' of the pit-shaped track addresses being in the range of $\lambda/8n$ to $\lambda/4n$, wherein n is the refraction index of the guide track portion and the track address portion on the substrate.

The width h of said guide tracks is, in a preferred embodiment, in the range of $0.5 \cdot /NA$ to $0.7 \cdot /NA$, wherein NA is the numerical aperture of an objective lens for condensing the laser light on the optical memory device.

The width h' of said pit-shaped track addresses is, in a preferred embodiment, in the range of $0.18 \cdot \lambda/NA$ to $0.38 \cdot \lambda/NA$.

Thus, the invention described herein makes possible the objects of (1) providing an optical memory device wherein the shape of the guide tracks of the substrate is improved, resulting in an excellent quality recording and/or regeneration signal; (2) providing an optical memory device wherein the shape of the pit-shaped track addresses is improved, resulting in an excellent quality track address signal; and (3) providing an optical memory device which can be readily manufactured.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

1. Introduction

Figure 1:
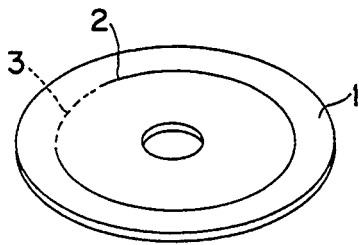
FIG. 1 is a schematic illustration showing the guide track portion and the track address portion formed in an optical memory device.
Figure 2:
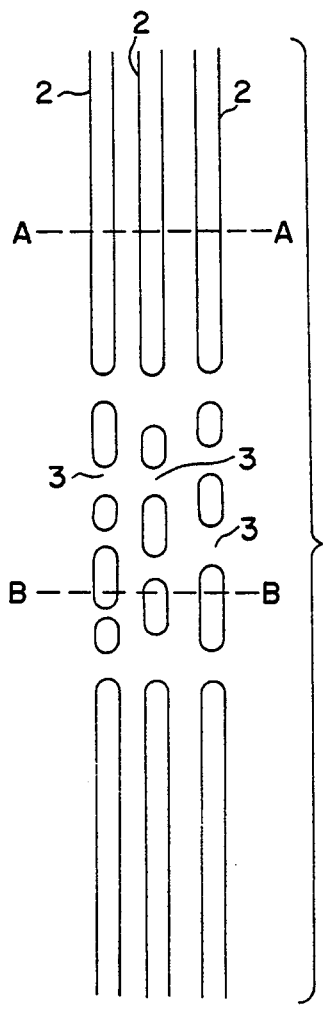
FIG. 2 is an enlarged plane view of the guide track portion and the track address portion.
Figure 3:
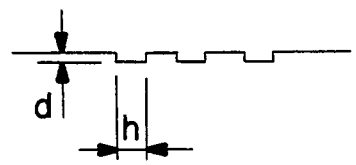
FIG. 3 is a sectional view of the guide track portion and the track address portion at the line A—A and B—B, respectively, in FIG. 2.
Figure 4:
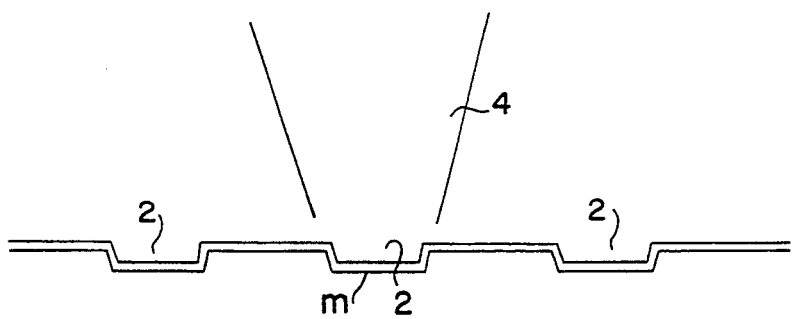
FIG. 4 is an enlarged sectional view of the guide track portion and the track address portion in FIG. 3.
Figure 5:
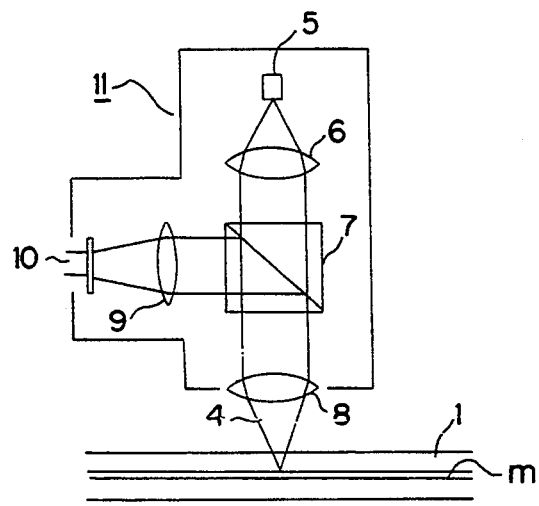
FIG. 5 is a schematic illustration showing the optical relationship between the optical head and the optical memory device.

FIG. 5 shows the optical relationship between the optical head for recording and regenerating information and the optical memory device. The optical head 11 comprising a laser light source 5, a collimating lens 6, a half prism 7, an objective lens 8, a condensing lens 9, a detector 10 and other necessary optical elements (not shown) emits the laser light 4 in a spot fashion through the objective lens 8 to a given portion of the recording medium layer m of the optical memory device, thereby attaining a record (or an erasure) of information thereon. When a given portion of the optical memory device is radiated by the laser light 4 in a spot fashion from the optical head in the same manner as above-mentioned and the resulting reflected light comes into the detector 10 through the objective lens 8, the half prism 7 and the condensing lens 9, information can be read out from the recording in the optical memory device, thereby attaining a regeneration of information.

Figure 6:
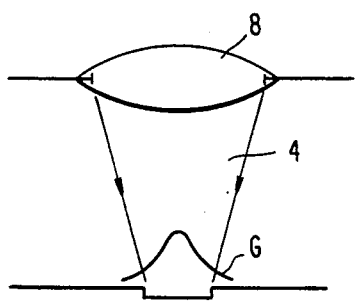
FIG. 6 is a schematic illustration showing the optical relationship between the objective lens and the incident laser light in a spot fashion to the optical memory device.

Tracking servo signal and track address signal, which serve as an indication as to whether or not a given portion of the recording medium layer m of the optical memory device is precisely radiated by the laser light spot 4, are described below:

When the intensity distribution of an incident light in the aperture of the objective lens 8 exhibits a Gaussian distribution, the intensity distribution G of a light spot at the focus of the objective lens 8 also indicates approximately the Gaussian distribution, as shown in FIG. 6, which is represented by the following equation:

$$i(r) = i_0 \cdot exp(-2 \cdot r^2 / r^2_0)$$

wherein $r_0$ is the radius in the case where the light intensity $i_{(r0)}$ is equal to $1/e^2$ times the light intensity $i_0$ at the center.

$$r_0 = t_0 / \pi \cdot \lambda / NA$$

wherein $\lambda$ is the wavelength of laser light, NA is the numerical aperture and $t_0$ is the value to be determined depending upon the relationship between the radius of the intensity distribution (Gaussian distribution) of an incident light in the aperture of the objective lens 8 and the numerical aperture NA of the objective lens 8. The value $t_O$ in the optical system of the optical head 11 is usually in the range of 1.2 to 1.4.

Figure 7A:
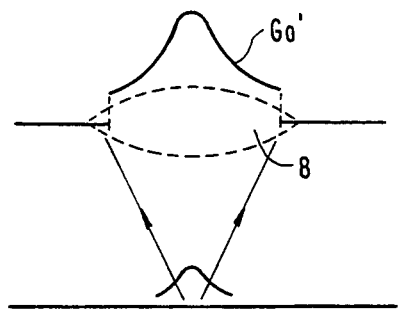
FIGS. 7(a), 7(b) and 7(c), respectively, are views showing the intensity distribution of the reflected light from the optical memory device in a variety of conditions.
Figure 7B:
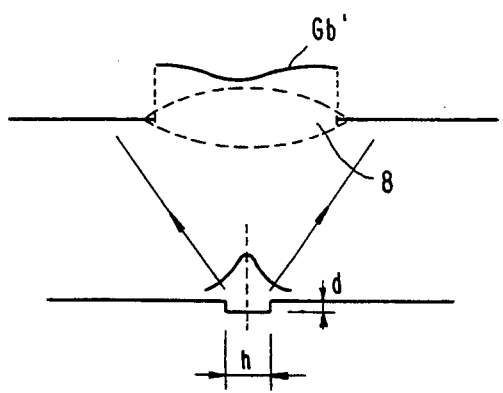
Figure 7C:
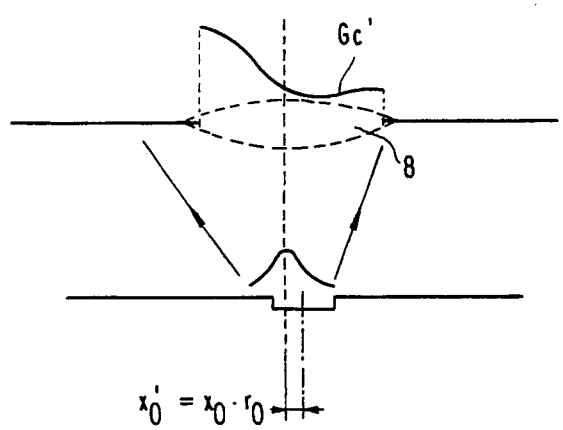

FIG. 7(a) indicates that the intensity distribution of the reflected light, at the time when a light spot is radiated to a flat face, approximately exhibits the Gaussian distribution. FIG. 7(b) indicates that the intensity distribution of the reflected light, at the time when a light spot is radiated to the center portion of a channel such as a guide track, exhibits the intensity distribution enlarged in the direction at right angles to the guide track under the influence of light diffraction due to the channel. FIG. 7(c) indicates that the intensity distribution of the reflected light, at the time when a light spot is radiated to a portion other than the center portion (e.g., the left with regard to the center) of a channel such as a guide track, is asymmetrically displaced to the left.

The difference between the left and the right of such as asymmetrical light intensity as shown in FIG. 7(c) is detected as a tracking servo signal by the use of a pair of detectors 10 shown in FIG. 5.

The tracking servo signal is zero for such a symmetrical light intensity as shown in FIG. 7(b) wherein a light spot reaches the center of the guide track, while it exhibits a plus(+) or minus(−) output depending upon the displaced direction as shown in FIG. 7(c).

The reflected light from the channel shown in FIG. 7(b) spreads in the lateral direction due to diffraction, and thus the quantity of the reflected light entering the detector 10 through the aperture of the objective lens 8 is less than that of the reflected light from such a flat face as in FIG. 7(a). The difference in quantity between the reflected lights is exhibited as a track address signal. Accordingly, when the guide track containing a pit-shaped track address portion is scanned with a light spot, the reflected light therefrom repeatedly exhibits such a specific light intensity distribution as shown in FIGS. 7(a) and 7(b), respectively, so that a variation in the quantity of the reflected light can be detected as a pit column.

As seen from the above description of the tracking servo signal and the track address signal, the recording and regeneration of information can be carried out by detecting optical variation in the recording medium layer within the guide tracks as a variation in the intensity of the reflected light therefrom. The diffraction of the reflected light varies with the shape of the tracks, causing a variation in the quantity of the reflected light entering the detector which results in the aforementioned noise.

The relationship between the quantity of the signal and the shape of the guide tracks is described below:

2. The Quantity of the Reflected Light (2.1) The quantity of the reflected light at the time when a laser light spot reaches a flat face:

When a laser light spot having a radius of $r_0$ reaches a flat face (given that the intensity distribution G of the light spot is the Gaussian distribution and the light intensity at the radius $r_0$ of the light spot is equal to $1/e_2$ times the light intensity at the center), the quantity $I_0$ of the reflected light entering the aperture of the objective lens 8 (the numerical aperture thereof being NA) can be represented by the following equation:

$$I_0 = 1 - e^{-2t_0}$$

wherein the quantity of light $I_0$ is 1 if the whole of the reflected light enters the aperture of the objective lens 8. Since $t_0$, which is in range of 1.2 to 1.4, can be represented by the following equation, $I_0$ must be in the range of 0.94 to 0.95:

$$t_0 = r_0 / [\lambda/(\pi \cdot NA)]$$

(2.2) The quantity of the reflected light at the time when a laser light spot reaches a rugged face:

When a laser light spot having a radius of $r_0$ reaches a channel such as the guide track portion and the pit-shaped track address portion, as shown in FIG. 7(b), the quantity D of the reflected light entering the aperture of the objective lens 8 can be represented by the following equation, which is standardized by the quantity $I_0$ of the reflected light from a flat face:

$$D = 1 - 1/(I_0) \cdot D(d) \cdot H(h)$$

wherein d is the depth of the tracks (the optical depth thereof being nd when the refraction index of the substrate is n) and h is the width of the tracks.

In the above-mentioned equation, D(d) is a function of the depth and H(h) is a function of the width, both of which can be represented by the following equations, respectively:

$$D(d) = 1 - \cos(4\pi\delta); \quad \delta = \frac{nd}{\lambda}$$

$$H(h) = \frac{4}{\pi} \int_0^{2\pi} \int_0^{t_0} e^{-2\omega^2} \cdot \omega \cdot F(1-F) d\omega d\theta$$

$$F = \int_{-s}^{s} \frac{1}{\sqrt{\pi}} e^{-(x+i\cdot\omega\cdot\cos\theta)^2} dx;$$

$$s = \frac{h}{2r_0} = \frac{h}{\frac{2t_0 \cdot \lambda}{\pi \cdot NA}}$$

Figure 8A:
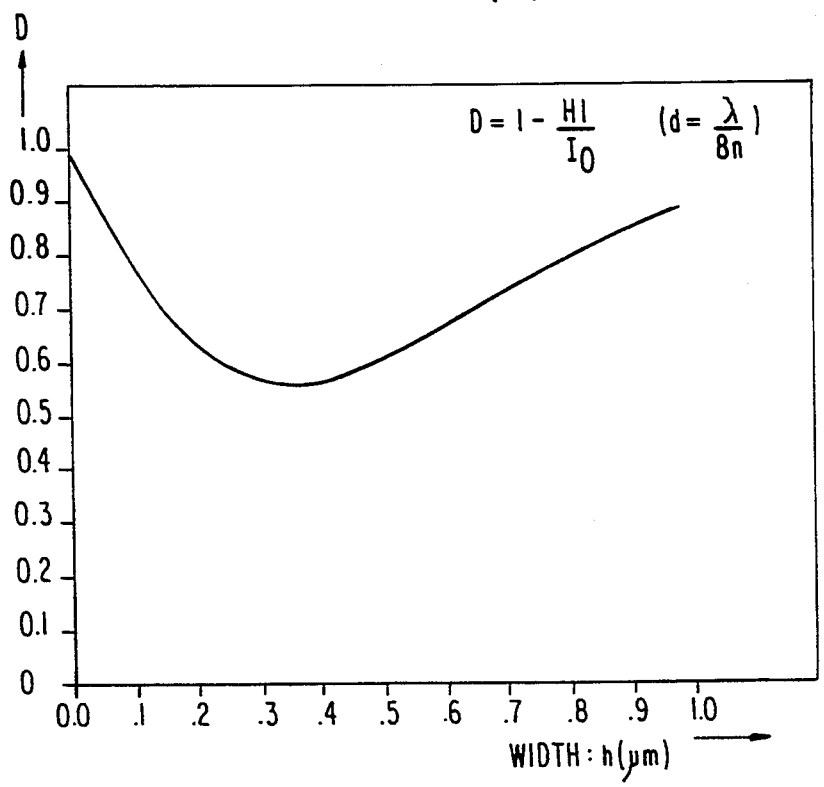
FIGS. 8(a) and 8(b), respectively, are graphs showing the relationship between the quantity of reflected light within the aperture of the objective lens and the shape of the guide tracks.

FIG. 8(a) shows the relationship between the quantity D of the reflected light entering the aperture and the width h of the tracks in the case where $d = \lambda/8n$ ($\delta = \frac{1}{8}$), namely $D(d) = 1$ and $D = 1 - H/I_0$, wherein $\lambda = 0.78$ μm, NA = 0.6, $r_0 = 0.55$ μm and $t_0 \approx 1.33$. FIG. 8(a) indicates that the quantity D of light is minimized when h is in the range of 0.23 to 0.5 μm, namely, h is in the range of $0.18 \cdot \lambda/NA$ to $0.38 \cdot \lambda/NA$ and it increases as the width exceeds the above-mentioned value (i.e., $0.27 \cdot \lambda/NA$).

Figure 8B:
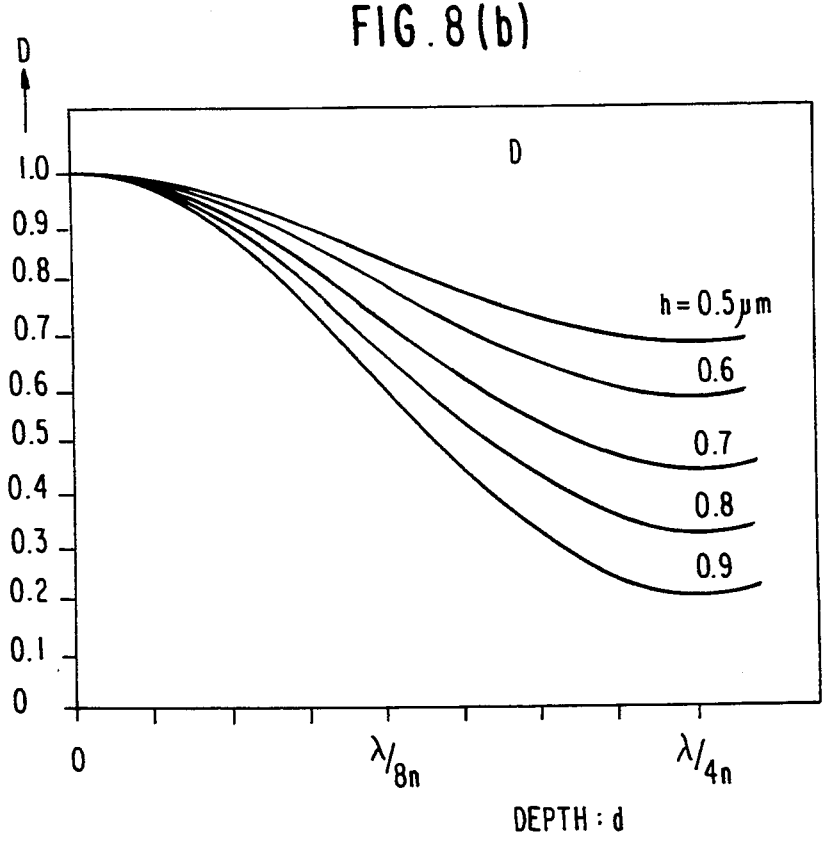

FIG. 8(b) shows the relationship between the quantity D of light and the depth of the tracks in the case where h = 0.5, 0.6, 0.7, 0.8 and 0.9, respectively, wherein $\lambda = 0.78$ μm, NA = 0.6, $r_0 = 0.55$ μm and $t_0 \approx 1.33$. It indicates that the quantity D of light decreases as the depth becomes greater and the quantity D is minimized when the depth d is $\lambda/4n$.

Since the quantity of information signal in the tracks increases with an increase in the quantity of light, the quantity of signal increases with a greater width h of the tracks or a lesser depth d of the tracks.

3. The Quantity of Track Address Signal

The quality Tn of track address signal are detected by repeatedly scanning the pit-shaped track channels and the flat portions with a light spot, and can be represented by a difference in the quantity of the reflected light in the aperture of the objective lens between the cases shown in FIGS. 7 (a) and 7 (b).

$$Tn = 1 - D = 1/I_0 \cdot D(d) \cdot H(h)$$

As seen from the description in Item (2.1), the quantity Tn of the track address signal are maximized when the width h' of the pit is in the range of $0.18 \cdot \lambda/NA$ to $0.38 \cdot \lambda/NA$ (it exhibits the maximum value when the width h' is $0.27 \cdot \lambda/NA$), while it is reduced as the width h' becomes great. The quantity Tn is also maximized when the depth d' of the pit is $\lambda/4n$, while it is reduced as the depth d' becomes less.

4. The Quantity of Tracking Servo Signal

As shown in FIG. 7(c), the intensity distribution G' of the reflected light, at the time when a laser light spot reaches a portion at the distance $x_0'(=r_0 \cdot x_0)$ from the center of the track, is displaced to the left at the distance $x_0'$ from the center of the track. When the quantity of light is divided into two parts at the center of the aperture of the objective lens 8, the difference in the quantity of light between the left and the right with regard to the center of the aperture is proportional to the displacement $x_0$ (wherein $x_0$ is small than 1). By detecting this difference in the quantity of light, which is represented by the following equation, the tracking servo signal can be obtained:

$$\Delta I = i \cdot \sin(4\pi\delta) \cdot \frac{4}{\pi} \int_0^{\pi} \int_0^{t_0} e^{-2\omega^2} \cdot \omega$$

$$(F^+ - F^-) d\omega d\theta$$

$$\begin{cases} F^+ = \int_{-s+x_0}^{s+x_0} \frac{1}{\sqrt{\pi}} e^{-(x+i\omega\cos\theta)^2} dx \\ F^- = \int_{-s-x_0}^{s-x_0} \frac{1}{\sqrt{\pi}} e^{-(x+i\omega\cos\theta)^2} dx \end{cases}$$

Thus, the sensitivity Ts of the difference $\Delta I$ in the quantity of light based on the displacement $x_0$, at the time when the light spot reaches the portion at the distance $x_0$ from the center of the track, can be represented by the following equation:

$$Ts = \frac{\partial(\Delta I)}{\partial x_0} \bigg|_{x_0=0}$$

$$Ts = \sin(4\pi\delta) \cdot \frac{4}{\pi} \int_0^{\pi} \int_0^{t_0} e^{-2\omega^2} \cdot \omega \cdot G d\omega d\theta$$

-continued $$G = \frac{4}{\sqrt{\pi}} e^{-s^2 + \omega^2 \cos 2\theta} \cdot \sin(2s\omega \cdot \cos\theta)$$

Figure 9A:
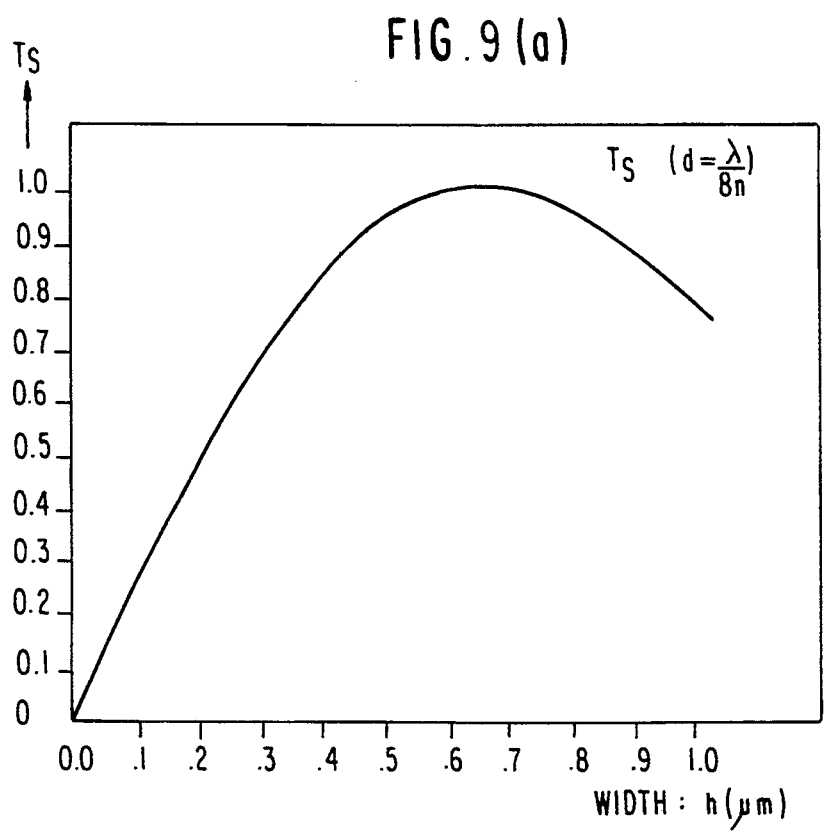
FIGS. 9(a) and 9(b), respectively, are graphs showing the relationship between the sensitivity of the tracking servo signal and the shape of the guide tracks.

FIG. 9(a) shows the relationship between the sensitivity Ts of the tracking servo signal and the width h of the tracks in the case where $d = \lambda/8n$ ($\delta = \frac{1}{8}$), wherein $\lambda = 0.78$ μm, NA=0.6, $r_0 = 0.55$ μm and $t_0 \approx 1.33$. The sensitivity Ts of the tracking servo signal is zero when the width h of the tracks is zero. The sensitivity Ts increases with an increase in the width h and it is maximized when h is nearly equal to 0.66 μm, while it decreases as the width exceeds 0.66 μm. When h is in the range of 0.45 to 0.9 μm, namely approximately 0.35·λ/NA to 0.7·λ/NA, the sensitivity Ts is maintained at the level of 0.9 times the maximum value.

Figure 9B:
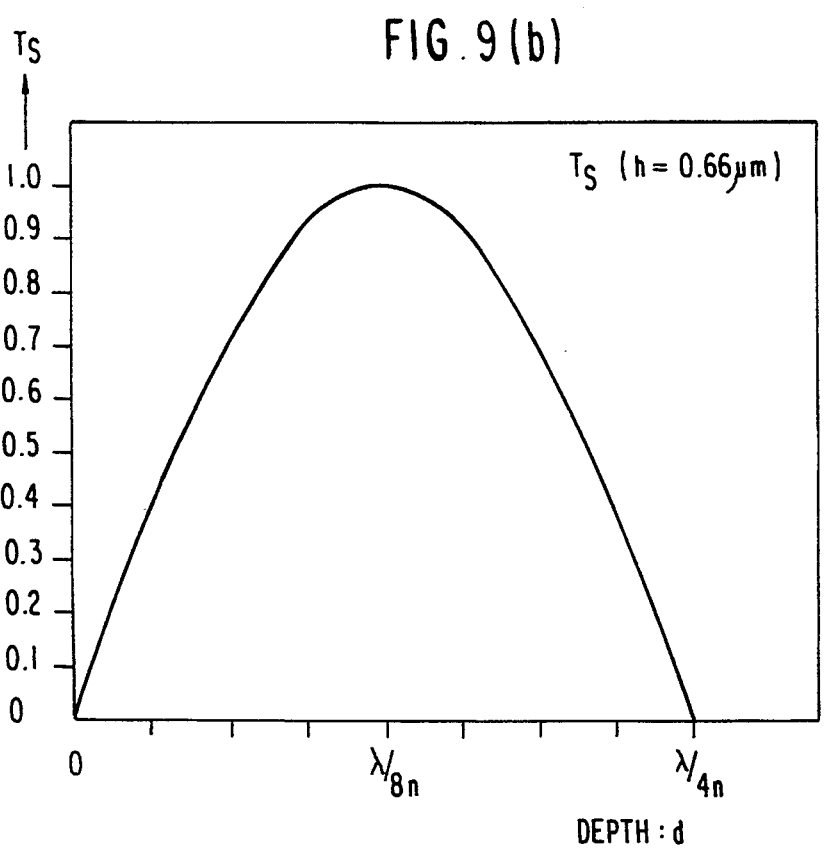

FIG. 9(b) shows the relationship between the sensitivity Ts of tracking servo signal and the depth d of the tracks in the case where h=0.66 μm, wherein $\lambda = 0.78$ μm, NA=0.6, $r_0 = 0.55$ μm and $t_0 \approx 1.33$. It indicates that the sensitivity Ts is a sine function of d and is maximized when $d = \lambda/8n$ ($\delta = \frac{1}{8}$).

Thus, it is advantageous for the tracking servo signal that the width h of the tracks must be set in the range of 0.35·λ/NA to 0.68·λ/NA and the depth d of the tracks must be set to be λ/8n.

5. Noise Due to the Shape of the Tracks

As mentioned above, the actual guide tracks are not formed with a structure having geometrically straight lines and/or curves, but microscopically have a varied and non-uniform structure. When the guide tracks are scanned with a light spot, the varied shape thereof causes a variation in diffraction, resulting in a variation in the quantity of the reflected light in the aperture of the objective lens.

Given that a variation in the edge portion of the tracks is the variation Δh in the track width, the variation ΔD in the quantity of light therein can be represented by the following equation:

$$\Delta D = \partial D/\partial h \cdot \Delta h$$

wherein ∂D/∂h is the rate of a variation ΔD in the quantity of the reflected light in the aperture to a variation Δh in the track width and indicates the rate at which the variation in the track shape appears as a noise in a regenerated light. Thus, if the relationship between the ∂D/∂h value and the shape of the tracks (i.e., d and h) becomes clear, it will be clear which shape of the tracks can minimize the quantity of noise resulting from the track shape.

Since $D = 1 - 1/I_0 \cdot D(d) \cdot H(h)$ as indicated in the Item (2.2), $$\partial D/\partial h = -1/I_0 \cdot D(d) \cdot H'(h).$$

wherein $$H'(h) = \frac{1}{2r_0} \cdot \frac{4}{\pi} \int_0^{2\pi} \int_0^{t_0} e^{-2\omega^2} \cdot \omega(1 - 2F) \cdot \frac{\partial F}{\partial s} d\omega d\theta$$

$$\partial F/\partial s = 2/\sqrt{\pi} \cdot e^{\omega^2 \cos 2\theta - s^2} \cdot \cos(2s^\omega \cdot \cos\theta)$$

FIG. 10(a) shows the relationship between the ∂D/∂h value and the width h of the tracks in the case where $d = \lambda/8n$ ($\delta = \frac{1}{8}$), wherein $\lambda = 0.78$ μm, NA=0.6, $r_0 = 0.55$ μm and $t_0 \approx 1.33$. The rate ∂D/∂h at which noise appears based on the shape of the tracks is minimized (i.e., nearly equal to zero) when h≈0.35 μm (h≈0.27·λ/NA), and the positive or negative sign of the ∂D/∂h value is reversed whenever the width h is greater or less than approximately 0.35 μm. The ∂D/∂h value is maximized when h≈0.65 μm (h≈0.5·λ/NA), while it is reduced as the width h becomes greater than approximately 0.65 μm.

Figure 10:
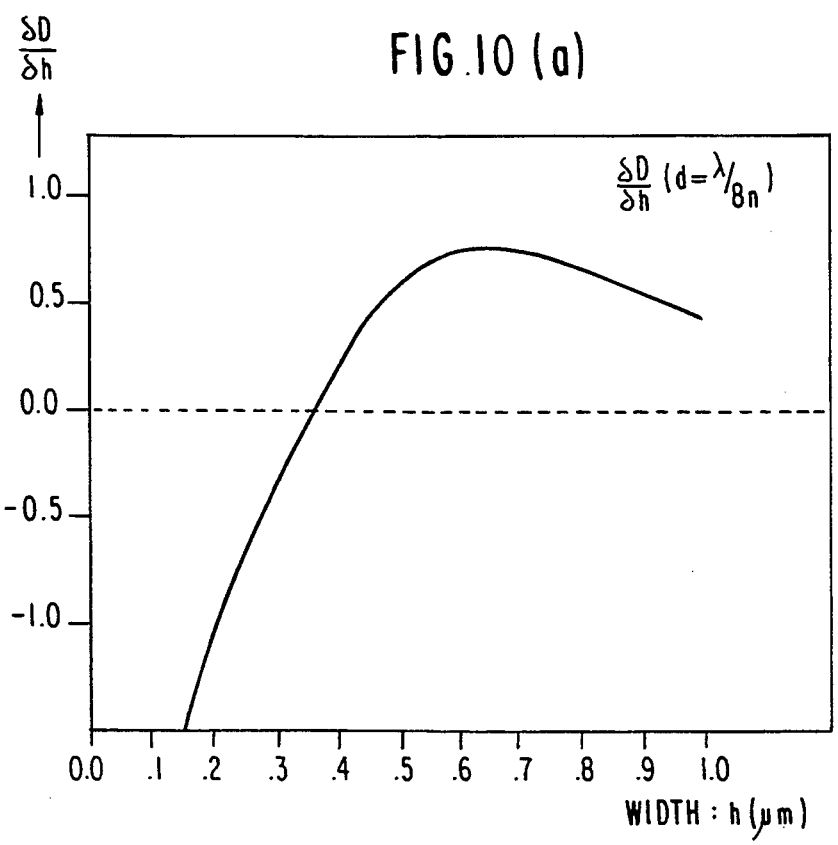
FIGS. 10(a) and 10(b), respectively, are graphs showing the relationship between the shape of the guide tracks and the noise resulting therefrom.
Figure 10:
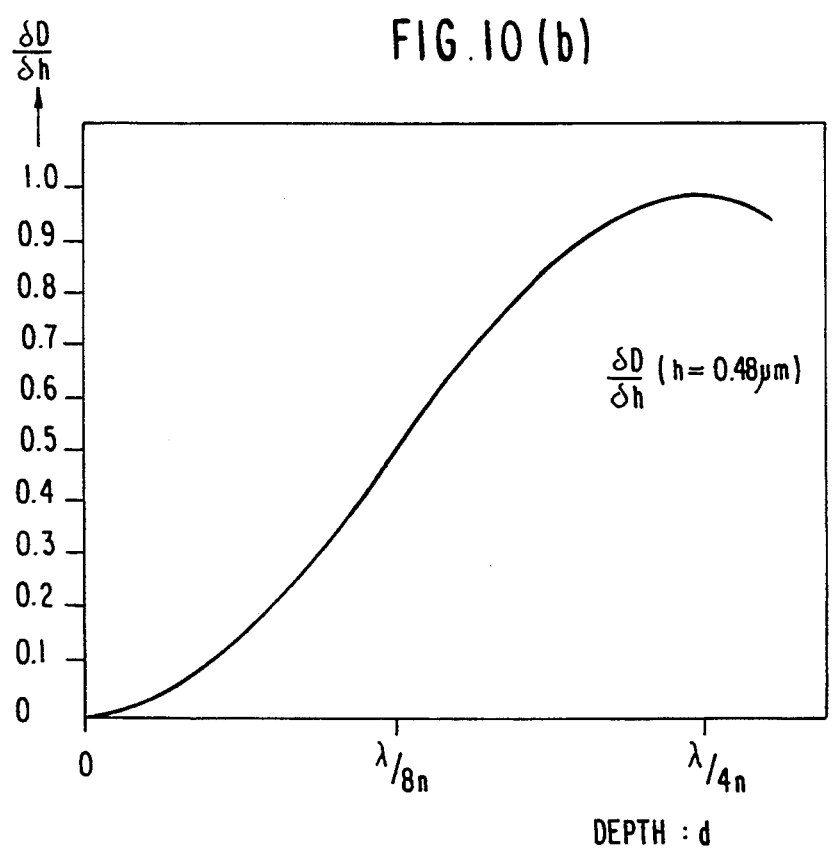

FIG. 10 (b) shows a curve illustrating the relationship between the ∂D/∂h value and the depth d of the tracks. The curve is of a cos function which is maximized when $d = \lambda/4n$ ($\delta = \frac{1}{4}$), and indicates that the less the depth d is in the range of 0 to λ/4n, the smaller the ∂D/∂h value becomes.

6. Conclusion

The above-mentioned discussion makes clear the relationship of the quantity of signal and noise with the shape of the tracks. The main object of this invention is to increase the quantity of information signal (S) and to decrease the quantity of noise (N) resulting from the shape of the tracks, resulting in an increase in the ratio of S to N, thereby providing an optical memory device which can produce record and/or regeneration signal having an excellent quality. For that purpose, the depth d of the tracks is required to be less than λ/8n notwithstanding the fact that the tracking servo signal are maximized when $d = \lambda/8n$. More particularly, the less the depth d, the more the S/N ratio increases.

The optimum shape of the tracks in each specific optical memory device can be determined as follows, depending upon the reflectivity of the recording medium layer and the formation necessity of the pit-shaped track address portion:

(i) For optical memory devices used for the recording of information based on variation in the reflectivity of the recording medium layer, the formation of pits, or the Kerr effect, the depth d of the tracks must be in the range of λ/12n to λ/48n, which is determined by experimental data showing that the sensitivity of the tracking servo signal detected by the reflectivity of the recording medium layer is high enough (i.e., in the range of about 0.87 to 0.26 times in the case where the depth is λ/8n). The quantity of the reflected light in the aperture of the objective lens at the time when the depth is in the above-mentioned range, is in the range of about 1.2 to 1.4 times that of the case where the depth is λ/8n, and noise resulting from the shape of the tracks is in the range of about 0.5 to 0.03 times that of the case where the depth is λ/8n, resulting in excellent quality information signal.

Figure 11A:
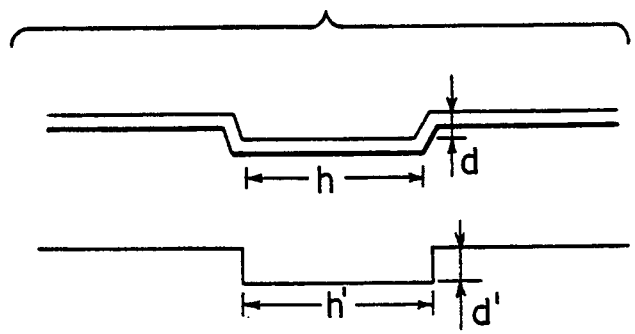
FIGS. 11(a) and 11(b), respectively, are sectional comparisons of guide tracks and information pits having varying depths and widths.

(ii) For optical memory devices having guide tracks, a part of which is formed into pit-shaped track addresses, the quantity of track address signal is in the range of 0.5 to 0.13 times and 0.13 to 0.03 times that of the case where the depth d is λ/8n, respectively, when the depth d is in the range of λ/12n to λ/24n and λ/24n to λ/48n. The formation of the guide track portion and the track address portion, the depths of both which are different from each other, is troublesome and expensive. Accordingly, in the case where the optical memory devices allow for an additional quantity of tracking address signal (for instance, the recording medium layer in each of the devices has a reflectivity which is the same as or greater than that described in Item (i)), the track address signal can be read out to the extent of about 0.13 times those at the time when the depth is $\lambda/8n$, and thus the depth d of the guide tracks is preferably equal to that of the track addresses with the range of $\lambda/12n$ to $\lambda/24n$, if the ready formation thereof is required. The quantity of the reflected light in the aperture at the time when the depth is in the above-mentioned range, is in the range of about 1.2 to 1.37 times that of the case where the depth i s $\lambda/8n$, and noise due to the shape of the tracks is in the range of about 0.5 to 1.3 times that of the case where the depth is $\lambda/8n$, resulting in excellent quality information signal. This embodiment is illustrated in FIG. 11(a).

(iii) For optical memory devices having guide tracks, a part of which is formed into pit-shaped track addresses, and having a recording medium layer with the reflectivity which is the same as or less than that described in Item (i), the depth d' of the pit-shaped track address portion is preferably greater than $\lambda/8n$ where the quantity of the track address signal is critical even though the formation of the tracks is complicated. In light of the fact that the quantity of the track address signal is maximized when the depth d' is $\lambda/4n$ and the quantity thereof is reduced as the depth becomes greater, the depth d' of the pit-shaped track address portion is preferably in the range of $\lambda/8n$ to $\lambda/4n$, wherein the quantity thereof is in the range of 1 to 2 times that at the time when the depth d' is $\lambda/8n$.

(iv) The width h of the guide tracks is preferably in the range of $0.5\cdot\lambda/NA$ to $0.7\cdot\lambda/NA$ in light of the fact that the quantity of the tracking servo signal is maximized when $h=0.5\cdot\lambda/NA$, the quantity thereof is about 0.9 times the maximum value thereof when h is in the range of $0.35\cdot\lambda/NA$ to $0.7\cdot\lambda/NA$, noise due to the shape of the tracks is reduced when h is $0.5\cdot\lambda/NA$ or greater, and the quantity of the reflected light in the aperture of the objective lens increase as h exceeds $0.27\cdot\lambda/NA$.

Figure 11B:
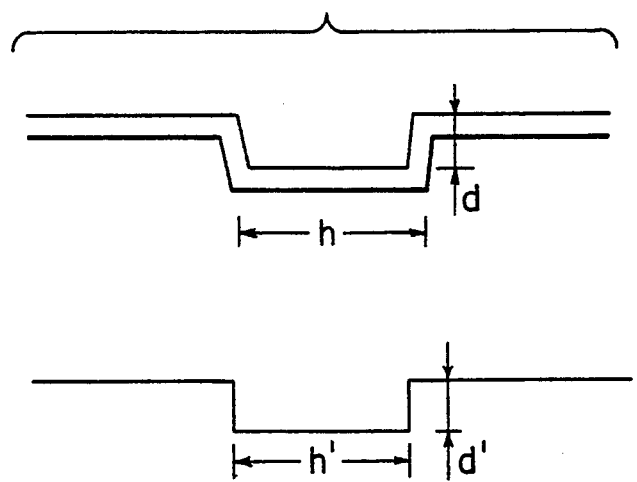

(v) The quantity of the track address signal is maximized when the width h' of the pit-shaped track address portion is $0.27\cdot\lambda/NA$, while noise due to the shape of the tracks is minimized when the width h' is the same as the above-mentioned. The quantity of the track address signal is about 0.9 times the maximum value thereof when the width h' of the tracks is in the range of $0.18\cdot\lambda/NA$ to $0.38\cdot\lambda/NA$, which is preferably selected for the width h' if the pit-shaped track address portion alone were required to have a narrower width than the other guide track portion to result in improved quality track address signal. An embodiment of the recording medium having guide grooves with widths different from the address pits is shown in FIG. 11(b).

The shape of the tracks in this invention is not limited to the edges which rise steeply as shown in FIGS. 3, 4, 7(b) and 7(c), but contains either oblique or curved edges.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty which reside in the present invention, including all features which would be treated as equivalents thereof by those skilled in the art to which this invention pertains.

What is claimed is:

1. An optical memory device comprising a substrate and guide tracks formed on said substrate,
   wherein a part of said guide tracks is formed into pit-shaped track addresses, said substrate comprises a recording medium formed thereon, said recording medium being used for the recording of information based on variations in a reflectivity thereof or a photomagnetic effect, the depth d of said guide tracks being in the range of $\lambda/24n$ to $\lambda/12n$ and the depth d' of said pit-shaped track addresses being in the range of $\lambda/8n$ to $\lambda/4n$,
   wherein the width h' of said pit-shaped track addresses is narrower that the width h of said guide tracks,
   wherein $\lambda$ is the wavelength of laser light used for the optical memory device, and n is the refraction index of the guide track portion and the track address portion of the substrate.

2. An optical memory device according to claim 1, wherein the width h' of said pit-shaped track addresses is in the range of $0.18\ \lambda/NA$ to $0.38\ \lambda/NA$, wherein NA is the numerical aperture of an objective lens for condensing the laser light on the optical memory device.

* * * * *

UNITED STATES PATENT AND TRADEMARK OFFICE
CERTIFICATE OF CORRECTION

PATENT NO. : 5,341,362
DATED : August 23, 1994
INVENTOR(S) : Yoshikazu Fujii et al.

It is certified that error appears in the above-indentified patent and that said Letters Patent is hereby corrected as shown below:

In column 2, line 47, the symbol --$\lambda$-- should be inserted both after "0.5." and "0.7."

In column 5, line 5, change "$r_0$reaches" to --$r_0$ reaches--

In column 8, line 24, change "signal" to --signals--

In the drawings, sheet 5, Figures 10(a) and 10(b) the symbol "$\delta$" should be --$\partial$-- (all occurrences)

Signed and Sealed this

Eleventh Day of April, 1995

Attest:

BRUCE LEHMAN

*Attesting Officer*                *Commissioner of Patents and Trademarks*